Aug. 25, 1942.   R. D. HILL   2,294,181
OIL FILTER ASSEMBLY
Filed Nov. 15, 1938
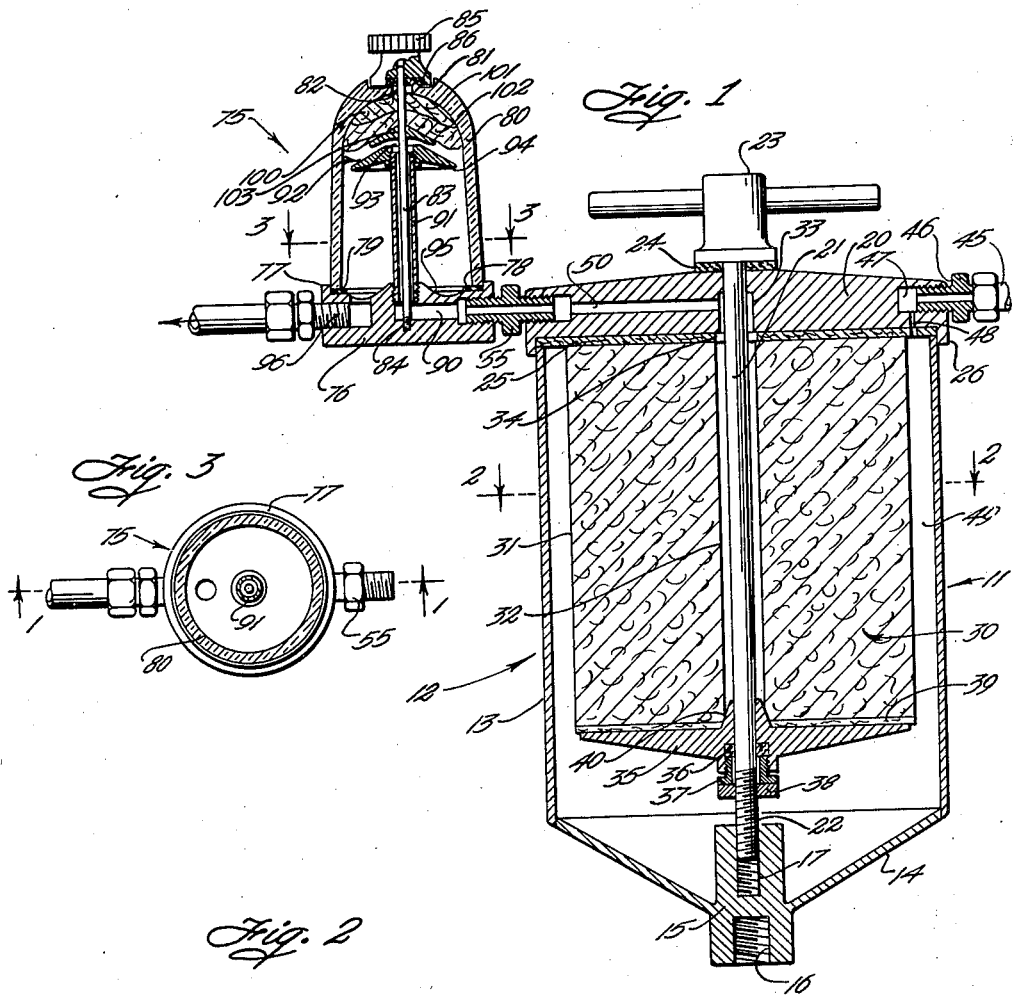
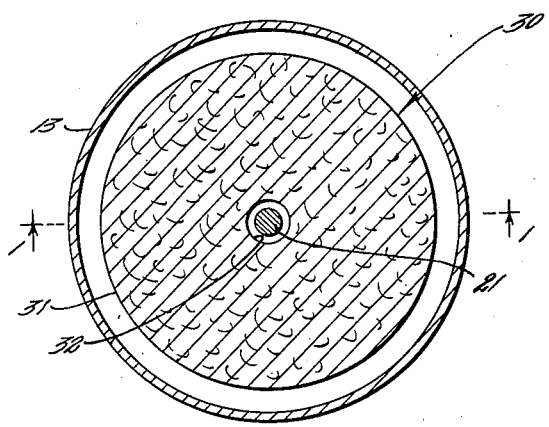
Inventor
ROLO D. HILL
By Hazard and Miller
Attorneys Patented Aug. 25, 1942

2,294,181

UNITED STATES PATENT OFFICE 2,294,181

OIL FILTER ASSEMBLY

Rolo D. Hill, Los Angeles, Calif., assignor of one-half to Guy S. Tucker, Los Angeles, Calif.

Application November 15, 1938, Serial No. 240,516

1 Claim. (Cl. 183—2.5)

My invention relates to an oil filter assembly, and as to certain aspects may be considered a further development or an improvement on the oil filter of my patent application Serial No. 152,123, filed July 6, 1937, which matured into Patent No. 2,145,304, issued January 31, 1939.

A characteristic of my present invention is that in the filter device proper I use preferably a cylindrical filter block having a central opening. The flow of oil in the filtration is from the periphery toward the center of the block, that is, such central opening, the oil then being directed by an upward flow to an outlet connected by suitable piping back to an engine crankcase, or the like. This type of oil filter assembly is designed to filter a portion of the total oil flow developed by a mechanical oil pump such as used on internal combustion engines of the automobile type whereby, should the filter become obstructed, there would still be a flow of oil under pressure to various parts of the engine.

My present invention simplifies the manner of mounting the filter on an engine block or in close proximity thereto, and secures a tight clamping of the cover or head to the enclosing casing which contains the filter block and also a space for the accumulation of sediment.

Therefore, an object and feature of the case or housing construction includes a housing or casing with a cylindrical side wall and preferably a cone base, this being provided with a substantial lug at the inverted apex, such lug having a threaded socket so that it may be attached directly to a stud screw or the like on the top of an engine block and thus the whole assembly mounted directly on the block of the engine or a suitable support adjacent thereto. The cover is clamped to the case forming an oil tight seal by means of a bolt extending downwardly through the center of the cap being provided with a hand grip wrench device at the top, the lower end of the bolt being threaded and engaging upwardly extending threaded socket in the lug at the bottom of the case. Suitable gaskets between the rim of the cylindrical side wall of the case and the cap prevent leakage. A bottom plate engaging the bolt pressing upwardly on the filter block restrains entrance of oil at the ends of the block, thereby requiring a filtering action from the periphery towards the center, the oil supply being directed to the space surrounding the periphery of the block.

My invention also includes an improved form of moisture or water absorbent from oil by absorbing the water in the oil vapor. This employs somewhat of a cone type of spreader as defined in my patent application above mentioned, together with an absorbent pad under which the thin film of oil flows. However, I make provision to prevent the direct contact of the oil with the absorbent pad.

My invention is illustrated in connection with the accompanying drawing in which, for sake of convenience, in Fig. 1 the filter assembly and the water absorbent assembly are illustrated connected in a vertical axial plane, such plane being considered as on the line 1—1 of Fig. 2 as to the filter assembly, and 1—1 of Fig. 3 as to the oil absorbent assembly.

Fig. 2 is a horizontal section on the line 2—2 of Fig. 1 in the direction of the arrows.

Fig. 3 is a section on the line 3—3 of Fig. 1 in the direction of the arrows.

Dealing first with the filter assembly designated 11, this includes a case or housing 12 which has a cylindrical side wall 13 and an inverted cone-shaped bottom 14 with a substantial lug 15 at the apex of the bottom. This lug has a threaded recess or socket 16 on the outside and a second threaded recess 17 on the inside. The cylinder has an upper edge transverse to its axis. The cap 20 is a substantial block having preferably a plane under surface and is secured to the casing by a bolt 21 passing through an opening in the cap and having a lower threaded end 22 threaded in the recess 17. This bolt is operated by a hand grip wrench 23 and has a gasket 24 to prevent leakage. There is a packing gasket 25 engaging the lower surface of the cap and the upper edge of the peripheral wall 13, this being confined by a downwardly extending flange 26. This construction forms a simple assembly for the cap and the casing and a simple manner of mounting the filter on an engine or the like as the socket 16 may be threaded on a stud or the equivalent on an engine block.

The filter block designated by the numeral 30 is preferably of a composition as defined in my patent application entitled Oil filter block composition and method of making, filed November 15, 1938, Serial No. 240,517, matured into Patent No. 2,145,304, issued January 31, 1939. This block has a cylindrical periphery 31 and also a cylindrical opening 32 between the ends. These ends are preferably transverse to the axis of the block and the bolt 21 extends therethrough. The cap has a recess 33 aligning with an opening 34 in the washer 25 and both of these being in alignment with the central opening 32 of the block. There is thus an annular space between the interior of the block and the bolt 21. The block is held tightly clamped against the washer 25 by a clamping disc 35 which has an opening therethrough to receive the bolt 21 and a threaded packed recess 36 in which is threaded a plug 37 and this plug is forced upwardly by a nut 38 on the bolt end 22. It is preferable to use a ring-like gasket 39 on top of the clamping disc and such disc also preferably has a cone-shaped center lug 40.

The oil circulation is by means of an inflow pipe 45 which is connected by a nipple 46 to a recess 47 in the cap 20 and from this recess there is an oil duct 48 leading to the annular space 49 between the periphery of the block and the inside of the cylindrical walls 13 of the case. This directs the inflowing oil into this space from whence it flows radially through the filter block. The filtered oil has an outlet through the exhaust duct 50 which leads from the recess 33 preferably radially to a nipple 55 whence it may lead back to the crankcase of the engine if the water absorbent device is not utilized.

The manner of operation of the filter so far described is substantially as follows: All of the oil entering passes into the annular space 49 and as the only passage for such oil is through the filter block from the periphery towards the center the flow is directed along somewhat radial lines. There is, however, a large peripheral area exposed or adjacent the outside of the cylinder where the oil contains most of the dirt to be removed. As the portion of the block adjacent its periphery extracts the foreign matter from the oil, such oil becomes clear and hence has a more ready flow through the smaller area of the block adjacent its center. The space above the conical bottom 14 and below the clamping plate 35 is of utility in providing for the accumulation of sediment, this accumulating well below the area of the moving or circulating oil so that it is not stirred up or carried again up to the filter block. The circulating oil, after passing through the block, flows upwardly through the center of the block and outwardly through the duct 50.

The water absorbent device and assembly designated 75 need not be directly connected to the cap 20 as illustrated for the sake of convenience. It is usual to have this device mounted on the dash or instrument panel where it may be readily observed by the driver of an automobile. This includes a base 76 which has an annular rim 77 and inside of this a flat annular seat 78 on which is located a gasket 79. An inverted cup 80 and preferably formed of glass has its lower edge resting on the gasket. This glass has a recess 81 at the top and a center perforation 82. A bolt 83 is threaded tight to the base 76 as indicated at 84 and extends upwardly through the center perforation 82 in the glass and has a finger grip knob 85 threaded thereon which compresses a packing 86 in the recess 81 in the top of the glass. The oil enters by an inlet duct 90 in the illustration, this being connected to nipple 55. It flows upwardly inside of a tube 91, that is, in the annular space between this tube and the bolt 83. At the top of the pipe there is a frustum of a cone 92, the oil discharging over the upper edge 93, flowing downwardly over the skirt portion 94, and dripping to the base 76 which has a shallow annular groove 95 to receive the oil drip, to the outlet 96.

The moisture absorbent material 100 is illustrated as constructed of two pads 101 and 102 packed in the upper end of the inverted glass cup and held in place by a metal disk 103 which is conical on its upper surface and is secured to the bolt 83 by soldering or by providing a threaded connection. The construction leaves a space between the skirt 94 of the cone 92 and the disk 103 which supports the absorbent pads.

As the oil flowing through the absorbent device is hot, the water vapor separates from the oil as it spreads over the skirt 94, such oil flowing upwardly in the annular space between the tube 91 and the bolt 83 as above mentioned. The disk 103 prevents the direct contact of the oil with the lower pad so that such pad is only subject to the water vapors in the oil and such vapors become absorbed thus extracting water mostly of contamination from the oil. When the pads become saturated the inverted cup may readily be removed and replacement pads inserted. These pads also absorb a small amount of the oil vapor but their main function is to absorb the water vapor.

Where it is inconvenient or impractical to support the filter by attaching through the medium of the socket 16 to a stud or the like on the engine or a fixed supporting structure, the filter may be suspended by the cap 20 which is provided with two or more threaded recesses in its peripheral edge, these not being shown in the drawing.

Various changes may be made in the details of the construction without departing from the spirit or scope of the invention as defined by the appended claim.

I claim:

In an oil filter assembly, a moisture absorbent device including a base having an inlet duct, an inverted cup mounted on the base of the absorbent device, a bolt secured to said latter base and extending upwardly, there being a top opening in the inverted cup, a tube secured to the latter base and extending upwardly and surrounding the bolt provided with an oil spreading structure having a cone shaped skirt, a disk secured to the bolt, an absorbent pad between the disk and the upper end of the cup and a nut connected to the upper end of the bolt and forming a clamping means with the top of the inverted cup, the base of the absorbent device having means to collect the drip of oil and an outlet in said base for the oil drip.

ROLO D. HILL.